United States Patent Office 3,311,870
Patented Mar. 28, 1967

3,311,870
SOLID STATE PROPORTIONAL COMMUTATOR
Bruce H. Grohe, Holliston, Mass., and Charles E. Walker, Mason, Ohio, assignors to Hazeltine Research, Inc., a corporation of Illinois
Filed Dec. 30, 1964, Ser. No. 422,267
11 Claims. (Cl. 340—6)

This invention relates to a commutator which is entirely electrical and therefore readily adaptable to solid state technology. More particularly, this invention is directed to a signal processing device for commutating and interpolating or proportioning a plurality of signals individually generated by a plurality of radiation sensors, such as, sonar transducers. While the invention to be described has general application, its most pertinent use is in the sonar field and it will be described in this environment.

As in radar, a fixed array of sonar transducers has been found to be more useful, for many applications, than the single rotating transducer. In the case of the rotating transducer, the bearing of a target is determined by the position of the sensor when a signal from that target is received. In the fixed aray of transducers, each transducer is rigidly mounted on the ship and therefore surveys a fixed known segment of the water with respect to the ship. A course indication of the bearing of a target is therefore given by noting which transducer has intercepted signals from that target. By having the response patterns of adjacent transducers overlap so that a signal from a target will be intercepted by more than one transducer, a more accurate indication of the bearing of the target can be determined by interpolating or proportioning the response that the intercepted signal creates in each transducer. In order to accomplish this result, the output of each transducer must be sequentially sampled in a repetitive pattern to determine which transducers have intercepted signals. At the same time the outputs of adjacent transducers which have detected targets must be interpolated to yield an accurate indication of the bearing of the detected targets.

Existing devices for accomplishing the above tasks generally take the form of a mechanical commutator. These devices have the obvious disadvantages of mechanical rotating machinery. They are bulky and cumbersome. The required slip-ring assemblies have a short life expectancy and introduce noise into the system. The speed of commutation is limited to the speed of rotation of the device. They have a further limitation of not providing the bearing accuracy required by advanced navigation and fire control systems.

It is, therefore, an object of the present invention to provide a new and improved signal processing system for commutating and interpolating the outputs of a plurality of radiation sensors.

It is also an object of the present invention to provide an entirely electrical signal processing device for commutating and interpolating the outputs of a plurality of sonar transducers which does not require a mechanical commutator.

In accordance with the present invention a signal processing apparatus for processing signals received by a plurality of sensors to permit determination of the bearings of the sources of the signals, comprises first means for supplying a plurality of information signals, each representative of the signals received by a corresponding sensor; second means for supplying a sampling waveform providing a plurality of gating signals; third means for supplying a plurality of sinusoidal waveforms whose frequency is substantially lower than the repetition rate of the gating signals; and a plurality of logic circuits, each responsive to one of the information signals, one of the sinusoidal waveforms and a plurality of the gating signals selected by coupling each successive gating signal to a separate logic circuit in a sequential repetitive pattern, for producing an output signal corresponding to each sensor comprising the selected plurality of gating signals whose envelope represents the sinusoidal waveform amplitude modulated by the information signal; and means for combining all the output signals to produce a resultant waveform which permits a simultaneous determination of which sensors have intercepted signals.

For a better understanding of the present invention together with other and further objects thereof, reference is had to the following description taken in connection with the accompanying drawings, and its scope will be pointed out in the appended claims.

Referring to the drawings.

Description

Figure 1:
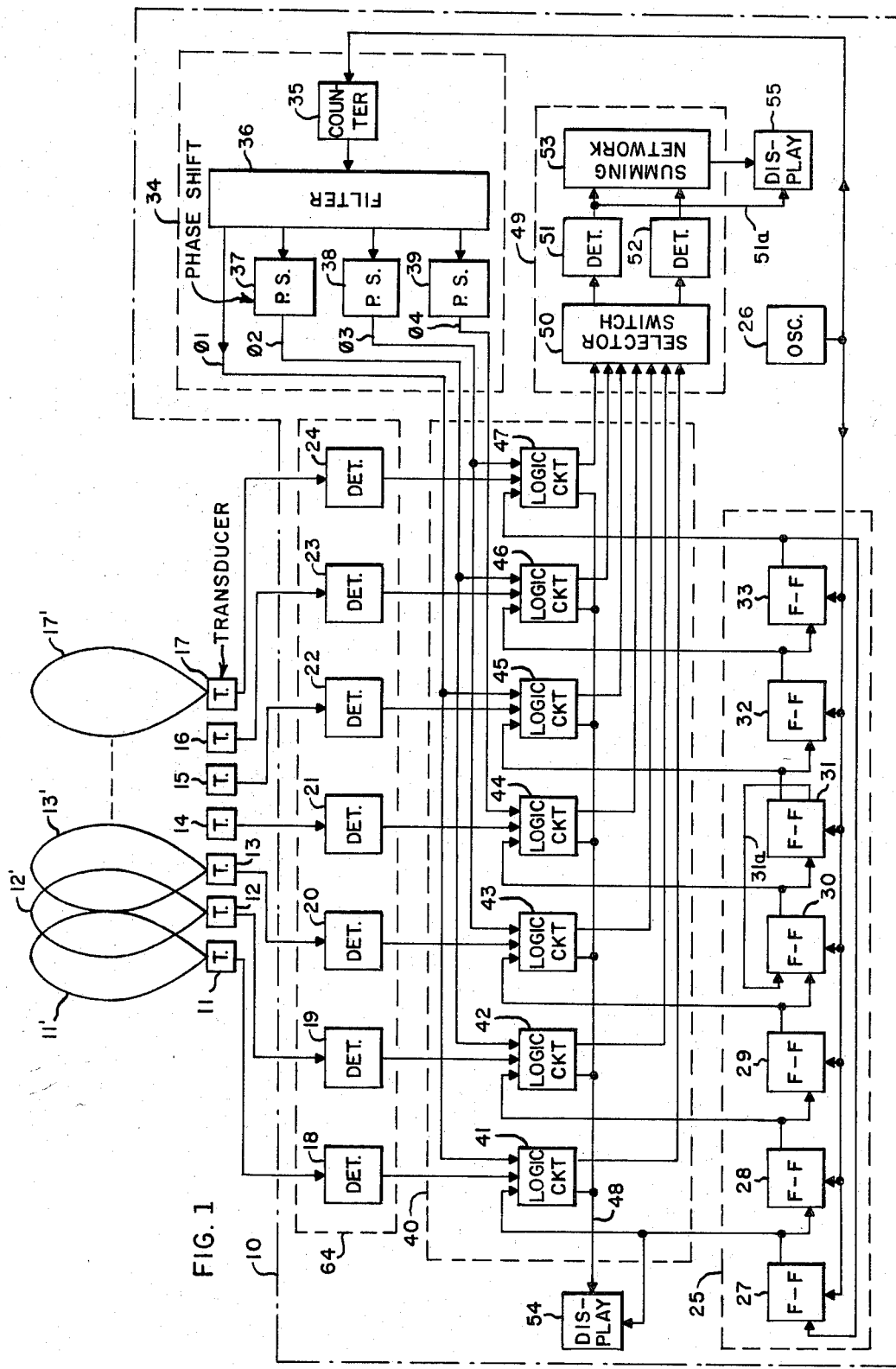
FIG. 1 is an embodiment of a sonar system constructed in accordance with the present invention.

Referring now to FIG. 1, there is shown an example of a sonar system constructed in accordance with the present invention. The system includes a fixed array of narrow beam sonar transducers represented by the boxes 11–17. The transducers are arranged so that normalized response patterns overlap, as indicated by response patterns 11'–17'. Therefore, a source of signals will be intercepted by at least two of said sonar transducers.

The sonar system also includes the signal processing apparatus 10. Signal processing apparatus 10 includes means 64 for supplying a plurality of information signals individually representative of the signals intercepted by sonar transducers 11–17, shown as detectors 18–24. These detectors may be devices such as square law detectors which develop information signals whose amplitude is directly related to the signal intensity of the signal intercepted by the sonar transducers 11–17. The signal processing system also includes means for supplying a sampling waveform that consists of a plurality of equally spaced pulses, such as shift register 25 and oscillator 26. Shift register 25 has separate stages, consisting of flip-flops 27–33, corresponding to each information signal supplied by detectors 18–24. Oscillator 26 is coupled to the shift input of each of these stages so that each pulse of the oscillator 26 causes a bit inserted in the register to be shifted one position.

Signal processing apparatus 10 further includes means 34 for generating a plurality of periodic waveforms that vary in a sinusoidal manner, such as counter 35 coupled to oscillator 26, low-pass filter 36 and phase shifting networks 37–39. Individual sinusoidal waveforms are supplied by filter 36 to each of the phase shifting networks 37–39.

Signal processing apparatus 10 also includes means 40 having a plurality of logic circuits 41–47 corresponding to the plurality of sonar transducers. Each logic circuit is responsive to the sampling waveform supplied by shift register 25, one of the sinusoidal varying waveforms supplied by means 34 and one of the said information signals supplied by detectors 18–24 for producing a plurality of output signals each comprising the result of said sinusoidal waveform modulated by said information signal and sequentially sampled in response to said sampling waveform.

Signal processing apparatus 10 further includes means for combining all the output signals to produce a first resultant waveform which permits the determination of which sonar transducers have intercepted signals, shown as the common connection 48. The waveform produced by common connection 48 is the resultant sequential sampling of each of the logic circuits 41–47.

Signal processing apparatus 10 further includes means 49 for selecting and combining the output signals which correspond to adjacent sonor transducers for producing for each source of intercepted signals a second resultant waveform which permits determination of the bearing of said source. Means 49 includes selector switch 50, detectors 51 and 52 and summing network 53.

Signal processing apparatus 10 also includes oscilloscopic type display 54 coupled to means 48 for displaying one cycle of the first resultant waveform and oscilloscopic type display 55 coupled to means 49 for displaying one cycle of said second resultant waveform.

Operation

The operation of the FIG. 1 embodiment will be explained in conjunction with the waveforms of FIG. 2. FIG. 1 has been limited to an array of seven sonar transducers and associated circuits for purposes of illustration, but in observing FIG. 1 it will be apparent that this system can be utilized with any desired number of sonar transducers. The interconnections between the sonar transducers, the detection circuits and the remainder of the signal processing apparatus follow a logical pattern and may be readily expanded as the number of sonar transducers desired increases.

In considering the operation of the sonar system of FIG. 1, it will be instructive to first five fuller consideration to the purpose of the system and the way this purpose is accomplished.

This is a bearing indicating system. Sonar transducers 11–17 are narrow beam devices. For example, their beam patterns might be 6° wide. By fixing the location of each transducer on the ship, the relative bearing of any target detected by one of the transducers will be known within the beam width of that transducer. For instance, assume sonar transducer 14 is centered on the bow of the ship. The relative bearing of a target detected by transducer 14 will be from −3° to +3° (from 3° to the left to 3° to the right). In order to more accurately determine the relative bearing of a detected target, the transducers are arranged so that the response patterns overlap. In the example where transducer 14 is centered on the bow and each transducer has a 6° beam pattern, transducers 11–13 would be situated so that the response patterns are centered at −9, −6 and −3°, respectively, and transducers 15–17 are situated so that the response patterns are centered at +3, +6 and +9°, respectively. Therefore, continuous surveillance is provided from 12° to the left to 12° to the right and signals from a target will be intercepted by at least two transducers. The responses a target generates in adjacent transducers may then be interpolated or compared to yield a more accurate indication of the bearing of the target.

In a single-transducer, mechanically rotating system, target information is generated sequentially by the mechanical scanning. In the array system, the entire area of interest is surveyed simultaneously. In order to convert to sequential information useful in indicating devices such as an oscilloscope, the outputs of the transducers must be sampled sequentially in a repetitive pattern to simulate the effect of the constantly rotating transducer. At the same time the outputs of the transducers are being sampled in a sequential repetitive pattern, a signal must be produced for each transducer which lends itself to interpolation with a similar signal produced by an adjacent transducer. This means produces a signal which can be combined with a similar signal and the contribution of each signal can readily be determined. A sinusoidal type signal readily lends itself to interpolation with another sinusoidal signal of different phase, as will be subsequently shown. Therefore, sinusoidal signals must be developed for each transducer with the sinusoidal signals developed for adjacent transducers having different phase angles. These sinusoidal signals are then modulated with the sampled information for each transducer so that the amplitude of each sinusoidal signal is related to the intensity of the signal intercepted by the corresponding transducer. Of course, to accomplish this the sinuosidal signal must be of a much lower frequency than the repetition rate of the sampling waveform. When it has been determined that a target has been detected by a particular pair of transducers, the sinusoidal signals that correspond to these transducers are combined as component signals to produce a resultant sinusoidal signal. This resultant signal allows interpolation of the component signals in that the location of the peak of the resultant signal with respect to the peaks of the component signals is a direct indication of the contribution of each component signal. Since the peak of each component signal corresponds to a known relative bearing, the peak location of the resultant waveform with respect to the component signals is a direct indication of the relative bearing of the detected target.

Figure 2:
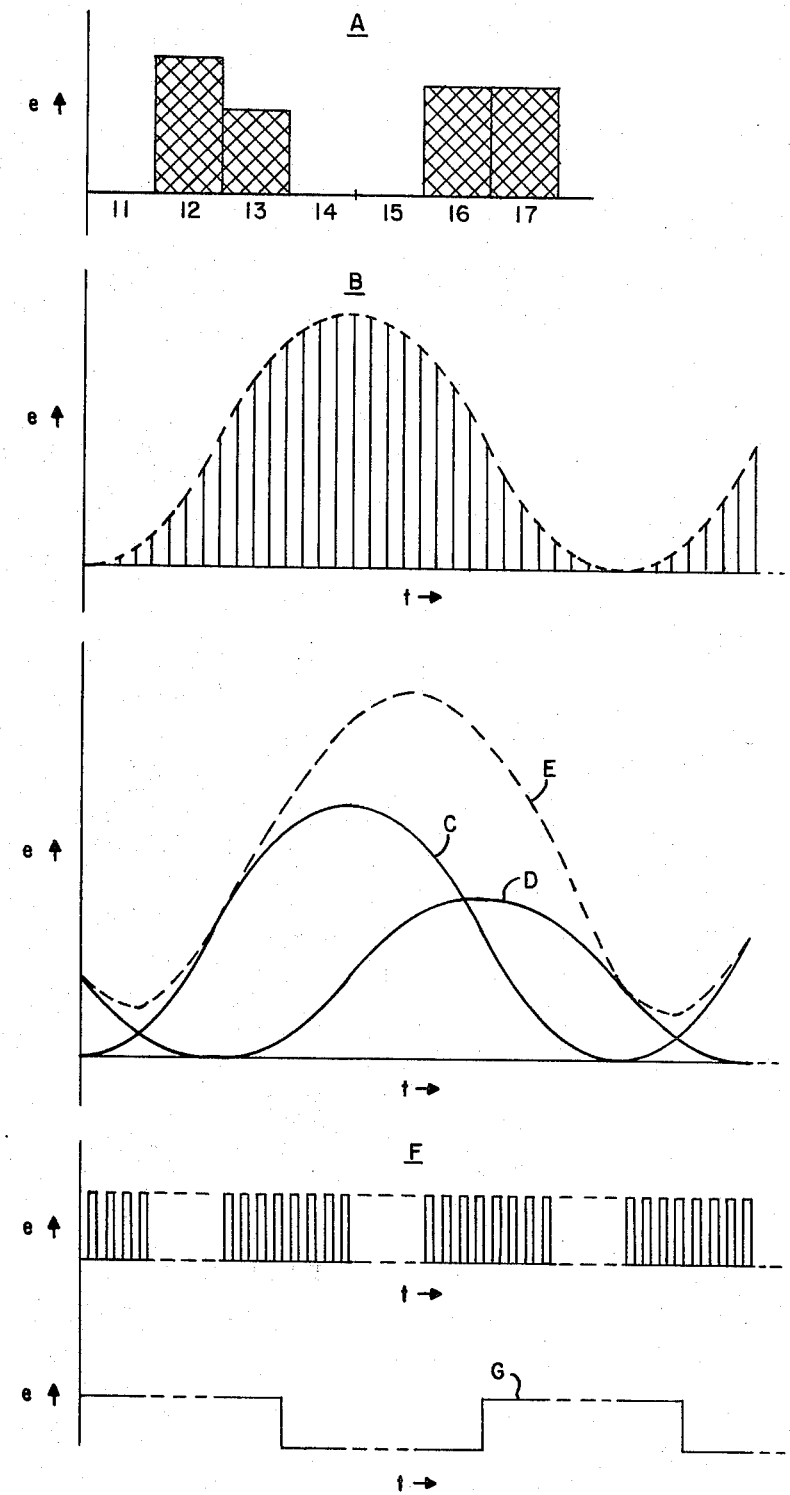
FIG. 2 is a group of waveforms useful in the explanation of the embodiment of FIG. 1.

For example, consider waveform A of FIG. 2 which represents the sequential sampling of transducers 11–17. As shown, a first target has been detected by transducers 12 and 13 and a second target by transducers 16 and 17. The second target has a relative bearing somewhere between 6° and 9° to the right. Since the signal from the target has generated an equal response by transducers 16 and 17, the target is located exactly 7½° to the right. But now consider the first target. It has a relative bearing of somewhere between 3° and 6° to the left and since the larger response has been generated by transducer 12, the relative bearing of the target is closer to 6° to the left than to 3°. It is impossible to determine more than this from these signals. Therefore, individual sinusoidal signals are modulated by the sampled pulses for transducers 12 and 13 producing waveforms similar to waveform B. The amplitude of this sinusoidal wave is dependent on the amplitude of the information signal. Actually, waveform B is a series of pulses having a sinusoidal envelope whose amplitude is dependent on the amplitude of the information signal. Detecting the sinusoidal component of each of these series of pulses produces waveform C which corresponds to transducer 12 and waveform D which corresponds to transducer 13. As previously stated, these sinusoidal signals are made to have different phase angles. The peak of waveform C is equivalent to a bearing of 6° to the left, the peak of waveform D corresponds to 3° to the left. Combining these signals produces a resultant sinusoidal waveform E whose peak location will fall somewhere between C and D and is a direct indication of the bearing of the target detected by transducers 12 and 13.

Considering now the operation of FIG. 1, the input signals intercepted by sonar transducers 11–17 are coupled to detectors 18–24. Each detector, which may be a square law detector or similar device, detects the target information intercepted by the corresponding transducer and develops an information signal such as a D.-C. level which is indicative of the intensity of the signal intercepted by the corresponding transducer. The information signals developed by detection circuits 18–24 are coupled to their corresponding logic circuits 41–47. The operation of these logic circuits will subsequently be explained in more detail. Also coupled to each of these logic circuits is an output from one stage of shift register 25. This shift register provides the sampling waveform to each logic circut in the following manner. A logical "1" is inserted in this register by an external source not shown. Each pulse supplied by oscillator 26 to the shift input of all of the flip-flops will shift this inserted bit, one position. A pulse is initiated at each flip-flop output coupled to its corresponding logic circuit when a logical "1" is shifted into that flip-flop. The pulse is terminated when the next oscillator pulse shifts the logical "1" out of that flip-flop into the next flip-flop, initiating a sampling pulse in that flip-flop. Lead 31a is typical of a connection that exists between all stages of the shift register but has been eliminated from the other stages to simplify the drawings. This connection serves to turn off the preceding flip-flop when the logical "1" has been shifted out of it.

A sampling waveform which will sequentially sample the information signals in a repetitive pattern is thereby supplied at the same rate as the oscillator repetition rate and having a pulse width equal to the time between oscillator pulses. The repetition rate of the sampling waveform supplied to a particular logic circuit is equal to the repetition rate of the oscillation divided by the number of logic circuits.

The output of oscillator 26 is also coupled to the counter 35. Counter 35 basically serves as a divider in that it produces an output for a given number of inputs, as shown by waveforms F and G. Waveform F represents the output of oscillator 26 and in a practical system might have a repetition rate of 512 kc. Waveform G would produce an output for each 512 inputs and each pulse output would have the width of 512 inputs thus producing a one kc. square wave.

The output of counter 35 is coupled to low-pass filter 36. Low-pass filter 36 will pass the fundamental of the one kc. square wave and reject all other frequencies thereby producing a one kc. sine wave. The output of low-pass filter 36 is coupled to phase shifters 37, 38 and 39. These phase shifters will produce sinusoidal signals whose phase angles differ from one another and from the output of low-pass filter 36. For optimum operation the phase angle difference of adjacent sinusoidal signals should be 360°/n where n is a multiple of the maximum number of sinusoidal signals that are to be interpolated for a single target. In the embodiment of FIG. 1, two adjacent sinusoidal signals are interpolated. Therefore, n could be 2, 4, etc. The smallest value of n that is practical is best since it will produce greater phase angle differences making interpolation easier. However, 2 is not practical since combining signals that are 180° apart do not produce the resultant sinusoidal waveform with a different peak location. Therefore, in the embodiment of FIG. 1, phase shifter 37 produces a sinusoidal signal which has a phase angle difference of 90° with respect to the output of low-pass filter 36, phase shifter 38 produces a sinusoidal signal which has a phase angle difference of 180° with respect to the output of low-pass filter 36 and phase shifter 39 produces a sinusoidal signal which has a phase angle difference of 270° with respect to the output of low-pass filter 36.

The outputs of the low-pass filter 36 and phase shifters 37, 38 and 39 are coupled to the logic circuits 41–47 in such order that the sinusoidal signals coupled to adjacent logic circuits have a phase angle difference of 90°. In other words, the output of low-pass filter 36 is coupled to logic circuits 41 and 45, the output of phase shifter 37 is coupled to logic circuits 42 and 46, the output of phase shifter 38 is coupled to logic circuits 43 and 47, and the output of phase shifter 39 is coupled to logic circuit 44.

Logic circuits 41–47 individually sample the information signals coupled from the corresponding detectors 11–17 with the sampling waveform coupled from the corresponding flip-flops 27–33 and modulates the sinusoidal waveform coupled from phase shifters 37–39 or low-pass filter 36 with the sampled information signal. Each logic circuit thereby produces a series of pulses at the repetition rate of the sampling waveform and having a sinusoidal envelope whose frequency is determined by the low-pass filter 36 and whose amplitude is determined by the information signal coupled to that logic circuit. The outputs of all the logic circuits are combined by coupling one output from each logic circuit to lead 48.

Lead 48 is coupled to oscilloscope 54. By choosing the sweep speed of the oscilloscope to be approximately the time required to sample each information signal once, and by triggering the scope with the sampling pulse coupled to logic circuit 41, a display similar to waveform A will be produced on the scope. As shown this pattern allows determination of which transducers have interrupted signals.

A second output from each of the logic circuits is individually coupled to selector switch 50. Having observed on display device 54 which transducers have detected a target, an operator would select the outputs of the corresponding logic circuits by making the proper choice on selector switch 50. For instance, having observed that a target has been detected by transducers 12 and 13, the operator would select the outputs of logic circuits 42 and 43. The two outputs selected are individually coupled to envelope detectors 51 and 52. Detectors 51 and 52 will detect the sinusoidal component of the input signals and therefore produce two sinusoidal waves which are 90° out of phase and probably of different amplitude, as illustrated by waveforms C and D. The outputs of envelope detectors 51 and 52 are coupled to summing network 53 where the two sinusoidal waves are combined to form a resultant periodic waveform. The peak of this resultant periodic waveform will lie somewhere between the peak of the two inputs to the summing network 53, as shown by waveform E. The output of the summing network 53, is coupled to an indicating device, such as oscilloscope 55.

The sweep speed of oscilloscope 55 is adjusted so that the oscilloscope displays one cycle of the resultant waveform as shown by wave form E. As previously stated, the location of the peak of the resultant waveform with respect to the component waveforms is an accurate indication of the bearing of the detected target. The peak of the resultant waveform E can be referenced to the component waveforms C and D in any one of several ways. For instance, a dual trace scope can be used and the resultant waveform superimposed on the leading waveform C of the two component waveforms. This requires a common trigger which would be provided by lead 51a. It would also be possible to calibrate the face of the scope and use the leading waveform C of the component waveforms to provide the trigger for the resultant waveform E.

Figure 3:
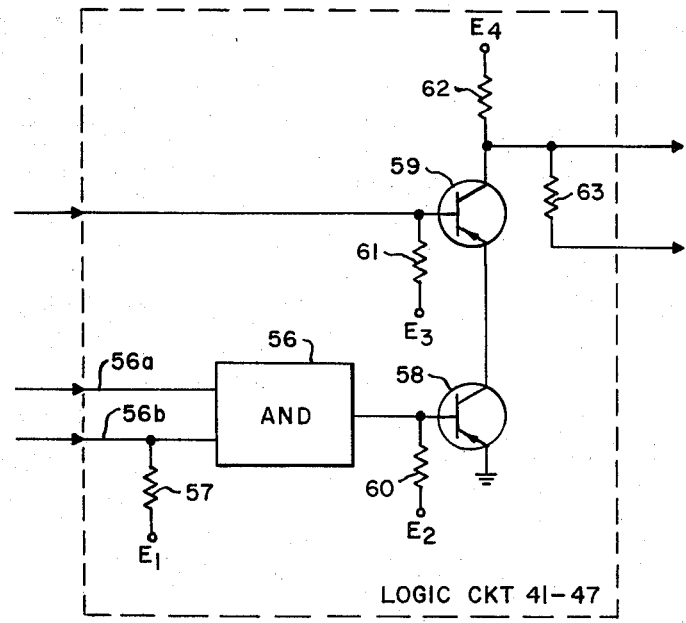
FIG. 3 is a representation of a logic circuit which may be used in the embodiment of FIG. 1.

FIG. 3 is a representation of one embodiment of a logic circuit usable in the present invention. As previously stated, the function of this circuit is to commutate or sample the information signals and to modulate the sinusoidal signal with the sampled information. In other words, the logic circuit combines three signals in a particular manner to perform two functions. However, since only the total output is of interest, it is immaterial in what order the signals are combined.

In the embodiment of FIG. 3, the sampling waveform and the sinusoidal waveform are coupled to AND circuit 56 by leads 56a and 56b, respectively. Lead 56b is coupled to supply $E_1$ by way of resistor 57 to supply the D.-C. level to the interpolation waveform necessary to establish a cosine squared function. In this embodiment of the logic circuit, all the inputs are negative going, therefore, $E_1$ is a negative voltage. The sampling waveform and the sinusoidal waveform have fixed amplitudes and the amplitude of the sampling waveform is chosen to be equal to or greater than the amplitude of the sinusoidal waveform. The output of AND circuit 56 will therefore be a series of pulses, having a sinusoidal envelope whose magnitude is dependent on the magnitude of the sampling waveform, similar to waveform B in FIG. 2. (The only difference is that in the embodiment of FIG. 3, the output of AND circuit 55 is negative going.)

The output of AND circuit 56 is coupled to the base of transistor 58. This signal is amplified and directly coupled to the emitter of transistor 59.

Transistors 58 and 59 are held nonconducting in the quiescent state by their respective bias circuits consisting of resistor 60 and supply $E_2$ and resistor 61 and supply $E_3$. The collector potential is coupled to these transistors by resistor 62 from source $E_4$. The cascade type connection of transistors 58 and 59 prevents an output from being developed at the collector of transistor 59 unless both transistors are conducting. Therefore, in order to generate an output at any instant, voltage must be provided by all three inputs, the sampling signal and the sinusoidal waveform coupled to AND circuit 56 and the information signals coupled to the base of transistor 59. The magnitude of this information signal is representative of the signal intensity of the observed target.

Transistor 59 will in effect multiply the signals coupled to its base and emitter. That is to say, the outputs developed at the collector will be proportional to both the voltage coupled to the base and the voltage coupled to the emitter. Since the voltage coupled to the emitter is a fixed voltage, the outputs developed at the collector are directly proportional to the information signal which is coupled to the base. This output, as shown by waveform B of FIG. 2, consists of a series of pulses of a sinusoidal varying envelope whose magnitude is dependent on the magnitude of the information signal. Resistor 63 is included to provide isolation between the two outputs required from each logic circuit, as shown in FIG. 1.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A signal processing apparatus for processing signals received by a plurality of sensors to permit determination of the bearings of the sources of said signals, comprising:

first means for supplying a plurality of information signals, each representative of the signals received by a corresponding sensor;

second means for supplying a sampling waveform providing a plurality of gating signals;

third means for supplying a plurality of sinusoidal waveforms whose frequency is substantially lower than the repetition rate of said gating signals;

and a plurality of logic circuits, each responsive to one of said information signals, one of said sinusoidal waveforms and a plurality of said gating signals selected by coupling each successive gating signal to a separate logic circuit in a sequential repetitive pattern, for producing an output signal corresponding to each sensor comprising said selected plurality of gating signals whose envelope represents said sinusoidal waveform amplitude modulated by said information signal;

and means for combining all the output signals to produce a resultant waveform which permits a simultaneous determination of which sensors have intercepted signals.

2. A signal processing apparatus as specified in claim 1 in which said second means supplies a sampling waveform consisting of a plurality of equally spaced pulses.

3. A signal processing apparatus as specified in claim 2 in which said plurality of logic circuits produces an output signal corresponding to each sensor whose sinusoidal envelope has a different relative phase angle than the sinusoidal envelope of the output signals corresponding to adjacent sensors and which also includes means for selecting and combining the output signals which correspond to adjacent sensors for producing for each source of intercepted signals a resultant waveform which permits determination of the bearing of said source.

4. A signal processing apparatus for processing input signals received by a plurality of sonar transducers to permit determination of the bearing of the sources of said signals, comprising:

first means for supplying a plurality of information signals, the amplitude of each representative of the signal intensity of the signals received by a corresponding transducer;

second means for supplying a sampling waveform consisting of a plurality of equally spaced pulses;

third means for supplying a plurality of sinusoidal waveforms whose frequency is substantially lower than the repetition rate of said sampling waveform with each of said sinusoidal waveforms having a different phase angle;

and a plurality of logic circuits, each responsive to one of said information signals, one of said sinusoidal waveforms and a plurality of said pulses, selected by coupling each successive pulse to a separate logic circuit in a sequential repetitive pattern, for producing an output signal corresponding to each sensor comprising said selected plurality of pulses whose envelope describes said sinusoidal waveform amplitude modulated by said logic circuit;

fifth means for combining all of said output signals to produce a resultant waveform which permits a continuous simultaneous display of the relative intensity of the signals intercepted by each transducer;

and sixth means for selecting and combining the output signals which correspond to adjacent transducers for producing for each source of intercepted signals a resultant waveform which permits interpolation of the relative intensity of the signals received by adjacent transducers.

5. A signal processing apparatus for processing input signals received by a plurality of sonar transducers to permit determination of the bearing of the sources generating said signals comprising:

first means for supplying a plurality of information signals individually representative of the input signals received by said sonar transducers, the amplitude of each information signal being directly related to the signal intensity of said input signal;

second means for supplying a sampling waveform including a shift register having a separate stage corresponding to each information signal and an oscillator coupled to said shift register so that each pulse of the oscillator causes an inserted bit in the register to be shifted one position;

third means including a counter coupled to said oscillator for producing a square wave of lower frequency than said oscillator, a low pass filter coupled to said counter for passing the fundamental frequency of said square wave and rejecting all other frequencies and a plurality of phase shifting networks coupled to said filter for supplying a plurality of sinusoidal varying waveforms which have different phase angles;

fourth means having a plurality of logic circuits corresponding to the plurality of sonar transducers, with each logic circuit coupled to an individual stage of said shift register, one of said phase shifting networks and one of said means for supplying information signals, for producing a plurality of output signals each comprising the result of said sinusoidal waveform modulated by said information signal and sequentially sampled in response to the sampling waveform;

fifth means for combining all the output signals to produce a first resultant waveform which permits the determination of which sonar transducers have intercepted signals;

and sixth means for selecting and combining the output signals which correspond to adjacent sonar transducers for producing for each source of intercepted signals a second resultant waveform which permits determination of the bearing of said source.

6. A signal processing apparatus as specified in claim 5 in which said fifth means comprises a common connection between all the output signals and said sixth means includes a switching apparatus for selecting the outputs of a plurality of logic circuits, an envelope detection circuit for extracting the sinusoidal component of each output selected and a summing network for combining the extracted sinusoidal components so that a resultant periodic wave is produced whose peak is an indication of the bearing of the source detected.

7. A signal processing apparatus as specified in claim 6 in which said low-pass filter and plurality of phase shifting networks supplies sinusoidal waveforms having phase angles of 0°, 90°, 180°, and 270°, and in which said logic circuits that correspond to adjacent sonar transducers are coupled to different ones of said phase shifting networks and in which said selecting means selects the outputs of two adjacent sonar transducers.

8. A signal processing apparatus as specified in claim 7 which also includes a first oscilloscope coupled to said fifth means for displaying one cycle of the first resultant waveform, one cycle of said first resultant waveform consisting of a single sampling of each of the information signals, and a second oscilloscope coupled to said sixth means for displaying one cycle of said second resultant waveform, the location of the peak of said second resultant waveform with respect to its component waveforms being a direct indication of the bearing of the source detected.

9. A sonar system comprising:
a fixed array of narrow beam sonar transducers arranged so that the normalized response patterns of adjacent tranducers overlap;
a plurality of detection means individually responsive to each of said sonar transducers for supplying a plurality of information signals individually representative of the input signals intercepted by said sonar transducers, the amplitude of each information signal being directly related to the signal intensity of said input signal;
means for supplying a sampling waveform including a shift register having a separate stage corresponding to each information signal and an oscillator coupled to said shift register so that each pulse of the oscillator causes an inserted bit in the register to be shifted one position;
means including a counter coupled to said oscillator for producing a square wave of lower frequency than said oscillator, a low-pass filter coupled to said counter for passing the fundamental frequency of said square wave and rejecting all other frequencies and a plurality of phase shifting networks coupled to said filter for supplying a plurality of sinusoidal varying waveforms which have different phase angles;
means having a plurality of logic circuits corresponding to the plurality of sonar transducers, with each logic circuit coupled to an individual stage of said shift register, one of said phase shifting networks and one of said means for supplying information signals, for producing a plurality of output signals each comprising the result of said sinusoidal waveform modulated by said information signal and sequentially sampled in response to the sampling waveform;
means for combining all the output signals to produce a first resultant waveform which permits the determination of which sonar transducers have intercepted signals;
and means for selecting and combining the output signals which correspond to adjacent sonar transducers for producing for each source of intercepted signals a second resultant waveform which permits determination of the bearing of said source.

10. A sonar system as specified in claim 9 in which said low-pass filter and plurality of phase shifting networks supplies sinusoidal waveforms having phase angles of 0°, 90°, 180°, and 270°, and in which said logic circuits that correspond to adjacent sonar transducers are coupled to different ones of said phase shifting networks and in which said selecting means selects the outputs of two adjacent sonar transducers.

11. A sonar system as specified in claim 10 which also includes a first oscilloscope for displaying one cycle of the first resultant waveform, one cycle of said first resultant waveform consisting of a single sampling of each of the information signals, and a second oscilloscope for displaying one cycle of said second resultant waveform, the location of the peak of said second resultant waveform with respect to its component waveforms being a direct indication of the bearing of the source detected.

References Cited by the Examiner
UNITED STATES PATENTS

| | | | |
|---|---|---|---|
| 2,767,386 | 10/1956 | Ross | 340—6 |
| 2,983,872 | 5/1961 | Williamson et al. | 328—27 |
| 3,108,251 | 10/1963 | Corbett | 340—16 |
| 3,163,844 | 12/1964 | Martin | 340—6 |

CHESTER L. JUSTUS, *Primary Examiner.*

R. A. FARLEY, *Assistant Examiner.*